(12) United States Patent
Gardner et al.

(10) Patent No.: US 6,327,275 B1
(45) Date of Patent: Dec. 4, 2001

(54) REMULTIPLEXING VARIABLE RATE BITSTREAMS USING A DELAY BUFFER AND RATE ESTIMATION

(75) Inventors: DelRae H. Gardner, Tualatin, OR (US); James E. Kaye, Pleasanton; Paul E. Haskell, Saratoga, both of CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/081,529

(22) Filed: May 19, 1998

(51) Int. Cl.[7] ................................. H04J 3/04; H04N 7/12
(52) U.S. Cl. .................. 370/535; 370/537; 370/516; 370/395; 348/423.1; 348/385
(58) Field of Search ....................... 370/395, 252, 370/498, 516, 517, 535, 536–545; 348/384–387, 423, 425

(56) References Cited

U.S. PATENT DOCUMENTS

| | | | |
|---|---|---|---|
| 5,606,369 | * | 2/1997 | Keesman ........................ 348/385 |
| 5,640,388 | * | 6/1997 | Woodhead ....................... 370/516 |
| 5,835,493 | * | 11/1998 | Magee .......................... 370/395 |
| 6,195,368 | * | 2/2001 | Gratacap ........................ 370/535 |

* cited by examiner

*Primary Examiner*—Ricky Ngo
*Assistant Examiner*—Steven Nguyen
(74) *Attorney, Agent, or Firm*—Barry R. Lipsitz

(57) ABSTRACT

A system for remultiplexing packets that are provided at variable rates in digital bitstreams using a delay buffer and rate estimation. A bitstream with specific packet types provided at different rates is extracted from a multiplex and combined with other fixed or variable rate bit streams in such a way that timing delivery constraints on the extracted variable rate bitstream are followed. The extracted bitstream is smoothed to reduce variations in the data rate. The smoothed bitstream is then processed in first and second parallel paths. In the first path, selected packets are discarded to obtain a retained data stream. The data rate of the retained data stream is estimated and provided to a control. In the second path, the smoothed bitstream is delayed according to at least the processing time of the rate estimator in the first path, then the selected packets are discarded to obtain a delayed, retained data stream. The retained data stream in the second path is then remultiplexed with other data streams at a rate near the estimated data rate. For example, the invention is suitable for use at a cable television headend which grooms and remultiplexes digital transport streams that comply with the MPEG-2 standard.

20 Claims, 3 Drawing Sheets

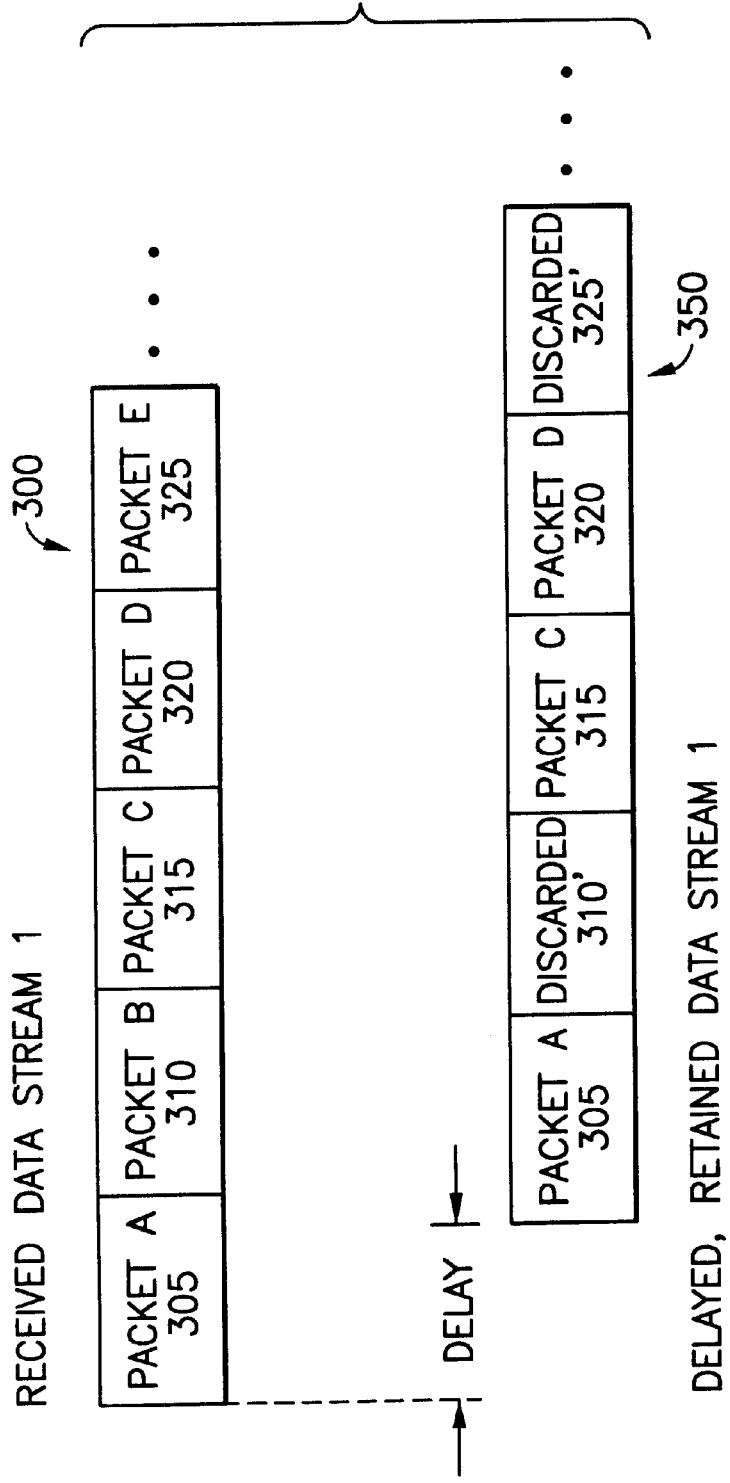

# REMULTIPLEXING VARIABLE RATE BITSTREAMS USING A DELAY BUFFER AND RATE ESTIMATION

BACKGROUND OF THE INVENTION

The present invention relates to a method and apparatus for remultiplexing packets that are provided at variable rates in digital bitstreams using a delay buffer and rate estimation. In particular, a bitstream is extracted from a multiplex and combined with other bitstreams in such a way that timing delivery constraints on the extracted bitstream are obeyed. For example, the invention is suitable for use at a cable television headend which grooms and remultiplexes digital transport streams that comply with the MPEG-2 standard.

The communication of digital video, audio, and other data has become increasingly common due to the improved fidelity, bandwidth efficiency, and versatility of digital signals relative to analog signals. For example, many cable television networks deliver digital television signals to users' homes via coaxial cable, or hybrid fiber and coaxial cable networks. Moreover, in addition to television signals, various other signals may be provided to the user, including audio only, video only, including still frame video, as well as data services, including Internet data, stock or weather data, computer games, and so forth. The provision of an upstream path from the user's home to the headend enables additional interactive capabilities.

The television or other data is transmitted from a headend of the cable network to a decoder at the user's home, and processed by the decoder to provide an output signal having a format that is compatible with the user's television, computer or other equipment.

The television or other data may be obtained by the headend via various methods. For example, the headend may have a local library of digital television programs or other data which is stored on magnetic storage media such as magnetic tape or computer disk drive, or optical storage media, such as compact disc, digital video disc, or laser disc. The headend may also receive digital television or other data from a transmission source, including, for example, a satellite distribution network, a terrestrial broadcast network, or a microwave distribution network.

Digital television data is provided in a format which is compatible with accepted industry standards. Currently, in the United States, one such standard is the MPEG-2 standard. In the future, high-definition television (HDTV) based on MPEG-2 is expected to become an industry standard.

The MPEG-2 standard provides strict timing and buffering requirements for the decoding of real-time data. For example, the decoder must be synchronized with the encoder. This is accomplished by providing a Program Clock Reference (PCR) field in the transport data stream. The PCR field essentially indicates the time when a packet of the data stream leaves the encoder. The decoder recovers and decodes the PCR field to determine the encoding time.

For buffering, the MPEG-2 standard requires the data rate of the transmitted data to be set such that the decoder buffer does not overflow or underflow. The decoder's buffer is modeled at the encoder in a Video Buffer Verifier (VBV) for this purpose. The encoder manipulates the encode rate (the rate at which digital data is produced by the encoder) and/or transmission rate such that at all times the decoder buffer does not overflow or underflow.

Accordingly, while an MPEG-2 packet has a fixed length (e.g., duration), the number of packets per second per source may vary such that the data source has a variable bit rate (VBR). Thus, the data rate of a data stream of such packets is fixed overall, but has packet components which are provided at relatively different rates or frequencies in the data stream. Moreover, streams of packets from different video or other sources are often time-multiplexed with one another to form one transport stream which is transmitted on a common carrier. The streams of packets from video and other sources may individually be variable bit rate (VBR), but the overall long term rate of the aggregate transport stream is usually fixed rate. Furthermore, several transport data streams may be transmitted to a headend concurrently on different carriers.

A data stream presents difficulties when one is required to remultiplex one or more VBR components from the data stream since the variable data rates of the components are not known. Only the aggregate rate is known. The individual rates of the constituents are unknown and vary continuously. Additionally, the remultiplexing task is made more difficult by the need to coordinate the timing of each of the different components.

Specifically, a remultiplexer receives one or more multiplexed or individual bitstreams as an input, extracts identified sub-components (e.g., stream of packets) from each input, and combines the extracted sub-components with other available bitstreams into a new output multiplexed bitstream (i.e., the remultiplexed data stream). Data from a local source, such as local storage media, video encoder, audio encoder, or other data source, may also be inserted into the remultiplexed data stream.

For example, a cable television headend may receive several transport streams, where each transport stream is a multiplex of packets from different video or other sources. However, it is often desired to transmit only a subset of the received packets to the users in the network due to bandwidth constraints, a tiered marketing scheme, or other programming requirements.

Accordingly, it would be desirable to provide a system for efficiently remultiplexing variable rate packets in a digital bitstream. The system should allow packets that are provided at a variable rate in a bitstream to be extracted from a received multiplex and combined with other bit streams in such a way that timing and buffer fullness constraints on the bitstream are obeyed. The system should also allow a local data source, such as one which is stored at a cable television headend, to be provided in the remultiplexed data stream.

The system should further be compatible with digital transport streams that comply with the MPEG-2 and similar communication standards wherein fixed length packets, VBR packet streams from each source, and a fixed rate multiplex are used. The system should also be compatible with compressed video, audio and other data.

The present invention provides a system having the above and other advantages.

SUMMARY OF THE INVENTION

The present invention relates to a method and apparatus for remultiplexing packets that are provided at variable rates in digital bitstreams, using a delay buffer and rate estimation.

In a particular embodiment, a method is disclosed for remultiplexing at least first and second packetized digital data streams which are received from a communication path, where at least the first data stream has packets provided at variable data rates therein. The method comprises the steps of: (a) processing the received first data stream in first and second parallel paths; (b) discarding and retaining particular packets of the first received data stream in the first path according to a packet selection signal to obtain a first retained data stream; (c) estimating a data rate of the first retained data stream; (d) providing a signal in the first path indicative of the estimated data rate; (e) delaying the first received data stream in the second path according to a processing delay of at least the estimating step (c) to provide a corresponding first delayed data stream; (f) discarding and retaining particular packets of the first delayed data stream according to the packet selection signal to obtain a first delayed, retained data stream in the second path which corresponds to the first retained data stream in the first path; and (g) providing a rate control signal according to the signal of the step (d) for time-multiplexing the first delayed, retained data stream with packets from the second data stream in a remultiplexed data stream.

Optionally, the method comprises the further step of: smoothing the first received data stream to reduce short-term fluctuations in its data rate prior to the processing step (a). Although the received data rate has an approximately fixed data rate when a long term (e.g., several packet) average is considered, the data rate may vary from packet to packet. The smoothing step uses a smoothing buffer to smooth the data rate of the first received data stream. The method optionally comprises the further steps of: (h) inputting the first received data stream to the smoothing buffer; (i) estimating a data rate of the first received data stream according to a fullness level of the smoothing buffer; (j) providing a rate control signal according to the estimated data rate from the step (i); and (k) outputting the first received data stream from the smoothing buffer according to the rate control signal of the step (j).

In another option, the delaying step (e) uses a delay buffer to delay the first received data stream. The method optionally comprises the further steps of: (h) estimating a smoothed data rate of the first received data stream; (i) inputting the first received data stream to the delay buffer; (j) outputting the first received data stream from the delay buffer according to the estimated data rate from the step (h). The method optionally comprises the further steps of: (k) smoothing the first received data stream using a smoothing buffer to reduce short-term fluctuations in its data rate prior to the processing step (a); (1) providing a control signal which indicates a fullness level of the smoothing buffer; (m) estimating a data rate of the first received data stream according to the control signal of the step (1); and (n) outputting the first received data stream from the smoothing buffer according to the estimated data rate of the step (m).

The packet selection signal designates packet identifiers of the packets which are to be discarded or retained.

In another option, the method comprises the further steps of: (h) buffering the first delayed, retained data stream provided in the step (f) in an output buffer; (i) providing the buffered first delayed, retained data stream to a multiplexer interface; and (j) providing the rate control signal from the step (g) to the multiplexer interface for time-multiplexing the first delayed, retained data stream with the packets from the second data stream in the remultiplexed data stream; wherein: the buffering step reduces timing variations in the first delayed data stream provided in the delaying step (e) relative to the first delayed, retained data stream provided to the multiplexer interface in the step (i).

The method optionally comprises the further steps of: time-multiplexing a local data signal with the first delayed, retained data stream and the packets from the second data stream in the remultiplexed data stream.

The first received data stream may comprise fixed length packets, such as those conforming to the MPEG-2 standard.

The second data stream may also have packets provided at variable data rates, in which case it is processed analogously to the first data stream to obtain a second delayed, retained data stream, which is then multiplexed with the first delayed, retained data stream in the remultiplexed data stream. Parallel processing may be used to process each data stream at the same time. Moreover, more than two data streams may be combined. A variable rate data stream may be remultiplexed with fixed rate data streams as well as other variable rate data streams.

A corresponding apparatus is also presented.

BRIEF DESCRIPTION OF THE DRAWINGS

FIG. 3 illustrates packets from a received data stream, and from a delayed, retained data stream in accordance with the present invention.

Figure 1:
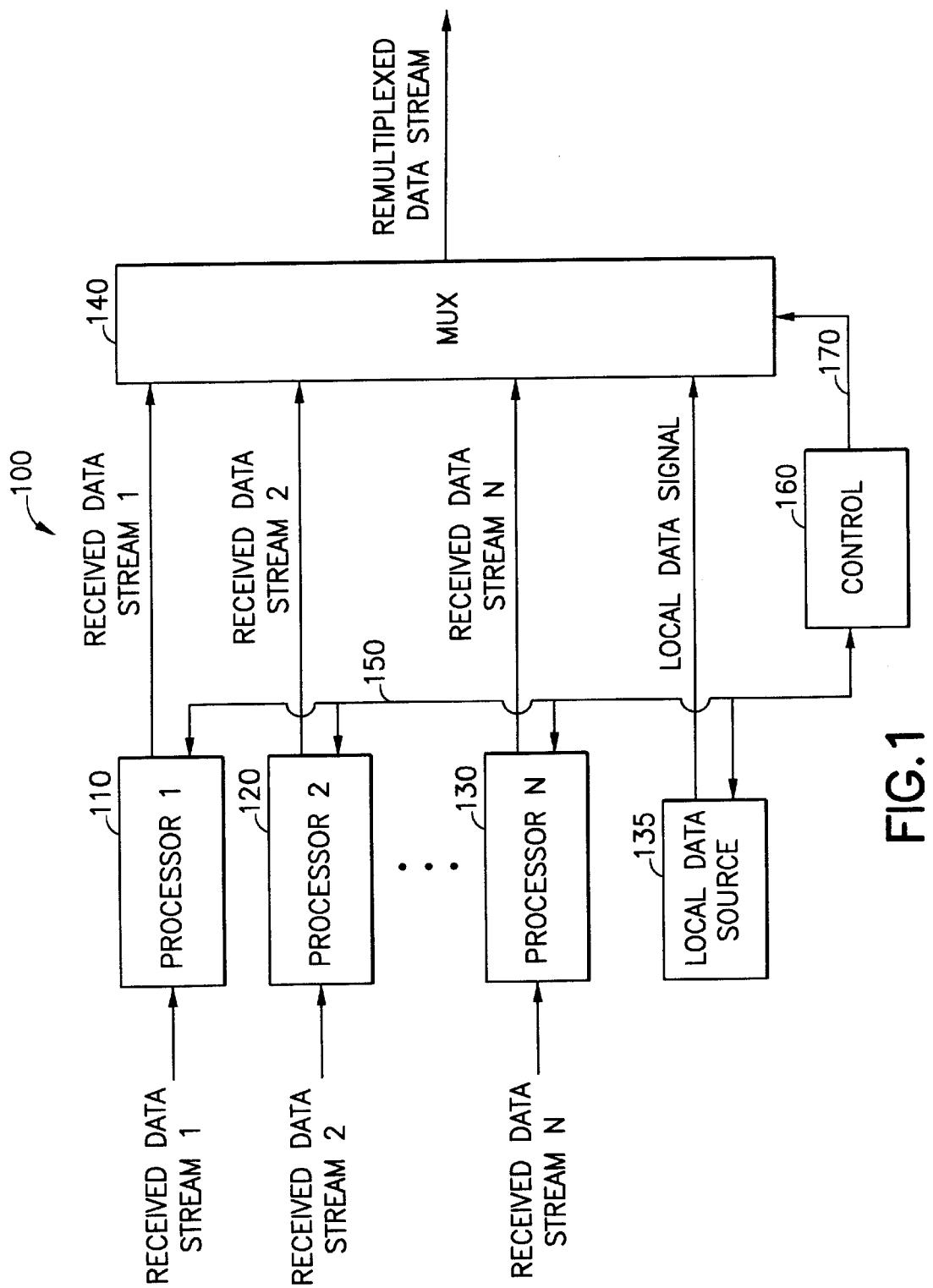
FIG. 1 illustrates a remultiplexer in accordance with the present invention.

The received data streams 1, 2, . . . , N have a generally constant data rate when viewed over a long interval, e.g., over a time interval which includes several packets. However, within each data stream, there will be short term variations in the frequency of occurrence of packets from a given data source.

For example, assume the received data stream 1 has packets from source A, source B, and source C. For example, each source may represent a different television program or channel. In a given time interval, the following sequence of packets may be provided in the received data stream 1: A, B, C, A, A, B, C, A, A, B. Then, the data rate of source A is five packets per time interval, while the data rate of source B is three packets per time interval, and the data rate of source C is two packets per time interval. The overall data rate is fixed at ten packets per time interval.

The processors 110, 120, . . . , 130 discard a portion (e.g., specific packets) of the respective received data streams 1, 2, . . . , N to provide the respective processed data streams 1, 2, . . . , N. For example, the processed data stream 1 may have all the "B" packets discarded, which yields the following sequence of packets: A, --, C, A, A, C, A, A, --, where "--" indicates no data. The rate of occurrence of the packets in the processed data streams may be fixed or varying in a given time interval.

A control 160, such as a microprocessor, receives signals from, and sends signals to, the processors 110, 120, . . . , 130 via a bus or other communication path 150 to ensure that the decoder buffer and timing requirements are met. The control 160 also sends control signals to the MUX 140 via a communication path 170 to control the outputting of the processed data streams 1, 2, . . . , N in a time-multiplexed manner to provide a remultiplexed data stream. One or more packets from the processed data streams 1, 2, . . . , N may be provided to the MUX 140 at a time. Generally, only one packet per cycle is output from the MUX 140.

The remultiplexed data stream is then transmitted to one or more decoders via any convenient communication path, including, for example, a cable television network, a satellite network, or a microwave distribution network. The control 160 may be incorporated into the MUX 140 rather than being a discrete element.

A local data signal may optionally be provided to the MUX 140 from a local data source 135, such as a magnetic or optical storage medium, a video or audio encoder, or other data source. This type of data may be provided to the MUX 140 at a fixed or variable data rate. The local data signal may be stored or received real-time.

Generally, for applications that require the remultiplexed data stream to have a constant bit rate, gaps in the processed data streams caused by the discarding of packets can be filled by data from the local data signal. That is, the local data signal, which may be obtained from local storage media, a video encoder, an audio encoder, or other data source, may be provided to the MUX 140 at a variable rate as necessary to provide the remultiplexed data stream at a constant bit rate.

Figure 2:
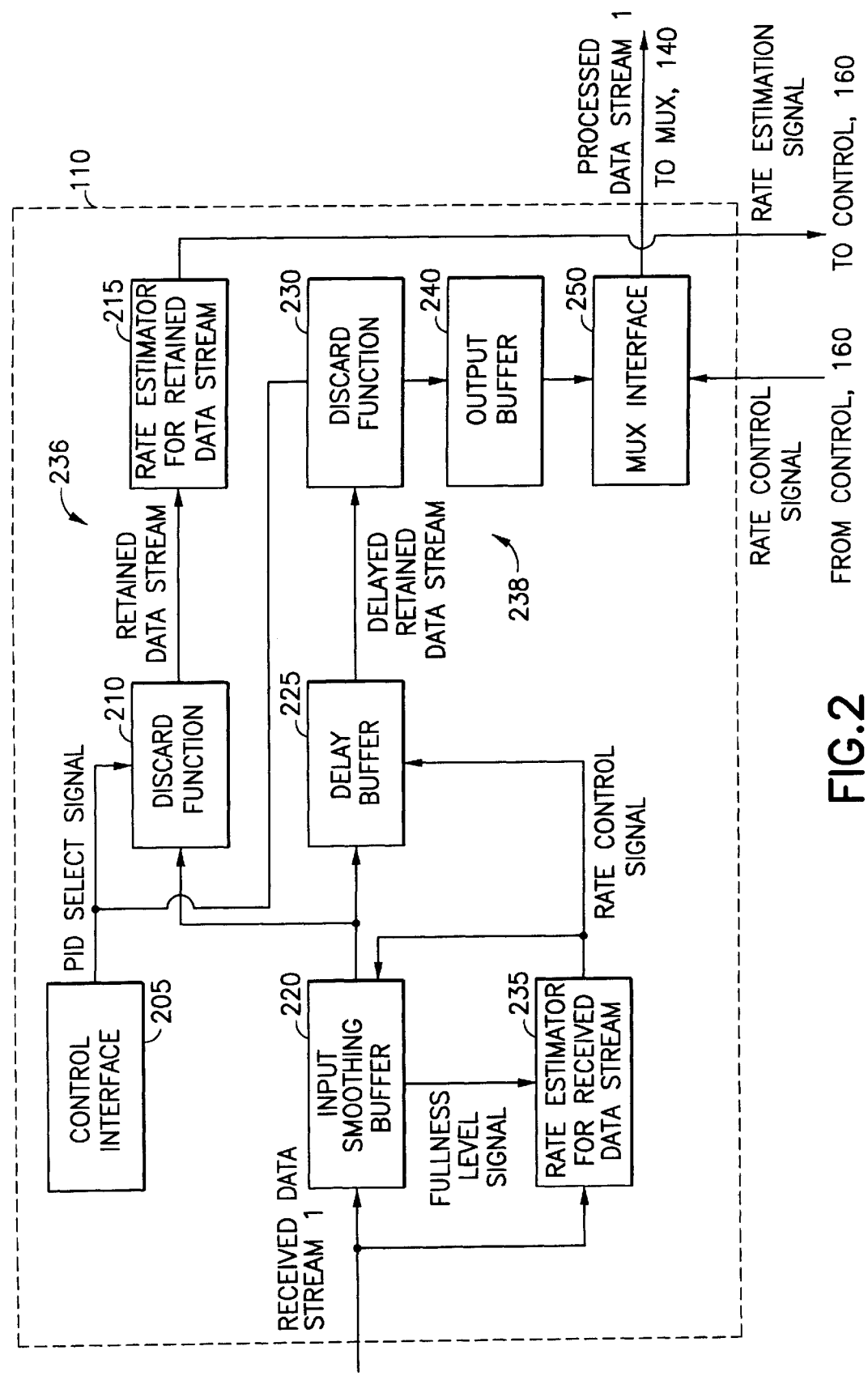
FIG. 2 illustrates a remultiplexing processor in accordance with the present invention.

FIG. 2 illustrates a remultiplexing processor in accordance with the present invention. For illustration, the remultiplexing processor 1 (110) and received data stream "1" of FIG. 1 are shown. The other remultiplexing processors of FIG. 1 may be constructed similarly. The control 160 and MUX 140 are used by each of the processors.

Within a single received data stream, a multiplex of fixed length packets from several data sources are provided. As mentioned, each packet has a fixed length, and the bitstream has an average bit rate which is fixed over a long time interval. However, the data rate can vary from packet to packet within the received data stream according to the relative frequency of occurrence of a given packet type, thereby causing short term fluctuations in the bit rate of a given packet type. That is, each packet may be transmitted at a varying delay relative to a fixed clock.

Each packet includes a header and a payload portion. The header includes information such as a packet identifier (PID) which identifies the data source. For example, for a multiplex of packets of television video or audio data, the PID identifies each packet as belonging to a particular television program, e.g., from a programming service provider (broadcaster) such as ABC, CNN, HBO and so forth. Other information, such as a virtual channel table, may also be transmitted in the data stream multiplexes.

The received data stream "1" is input to an input smoothing buffer 220 and to a rate estimator for the received data stream 235. The input smoothing buffer 220 may be a conventional first-in, first-out (FIFO) buffer. As the received data stream is stored in the input smoothing buffer 220, the buffer 220 sends a fullness level signal to the rate estimator for the received data stream 235. The rate estimator 235 estimates the bit rate of the received data stream based on the change in the buffer fullness level over a time interval. The time interval may extend over several packets to obtain a long-term average data rate for the received data stream. This long-term average will be relatively constant.

The rate estimator for the received data stream 235 provides a rate estimation signal to the input smoothing buffer 220 and to a delay buffer 225. The input smoothing buffer 220 outputs data from the received data stream at the estimated rate to the delay buffer 225 and to a discard function 210, while the delay buffer 225 outputs previously-stored data at the designated rate to a discard function 230. The delay buffer 225 may also be implemented as a FIFO buffer, and delays the data from the received data stream by an amount which corresponds at least to the time required for the rate estimator for the retained data stream 215, discussed below, to perform its function.

The input smoothing buffer 220 essentially smooths out short-term fluctuations in the data rate of the received data stream.

The discard function 210 removes selected packets from the smoothed data stream output from the input smoothing buffer 220. This may be accomplished in various ways. For example, the packets to be discarded or retained may be identified by their PIDs. A PID select signal may be provided to the discard function 210 from a control interface 205 to indicate the PIDs of the packets which are to be discarded or retained. The discard function 210 may then examine the PID of each packet to determine if the packet is to be discarded or retained. This may be accomplished with a look up table implemented in a memory. If the packet is to be discarded, no data from the packet is output from the discard function 210. The discard function 210 outputs a retained data stream which comprises the retained packets of the received data stream.

For example, the control interface 205 may be located at the headend of a cable television network to allow an operator to input the PID select signal to the discard function 210. Generally, for television video and audio data, it is expected that the PID select signal will remain constant for relatively long intervals, e.g., according to changes in the program schedule. The PID select signal may be entered by an operator for immediate communication to the discard function 210, or may be pre-stored and provided to the discard function 210 automatically at predetermined times.

As mentioned, it may be desirable to remultiplex one or more received data streams by discarding specific packets due to bandwidth constraints, a tiered marketing scheme, or other programming requirements.

The discarding of packets may be understood further with reference to FIG. 3, below.

The discard function 230 also receives the PID select signal and operates analogously to the discard function 210. The discard function 230 may receive the same PID select signal as the discard function 210, or another signal which provides the same information. The discard functions 210 and 230 essentially act as filters to filter out selected packets. Of course, different packets can be filtered out in the different data streams which are received by the different processors 110, 120, . . . , 130.

The discard function 230 receives the delayed and smoothed data stream from the delay buffer 225, and discards specific packets, for example, according to the PIDs. The delayed retained data stream is output from the discard function 230 to the output buffer 240. The delayed retained data stream corresponds to the retained data stream output from the discard function 210, but is delayed relative thereto.

This delay accounts for a processing delay of the rate estimator 215 as required to maintain synchronicity between data in a first path 236, including the discard function 210 and the rate estimator 215, and data in a second path 238, including the delay buffer 225, discard function 230, output buffer 240 and MUX interface 250. The first path 236 and second path 238 preferably operate in parallel for optimum processing speed.

An output buffer 240 receives the delayed retained data stream from the discard function 230, and provides the data stream to a MUX interface 250. This buffer may also be a FIFO buffer.

The retained data stream from the discard function 210 is provided to a rate estimator for the retained data stream 215, which estimates the data rate of the retained data stream over short, well-defined time intervals, e.g., every $\frac{1}{30}$ second. This rate varies with the amount of data that is retained in the different time intervals. The data rate of the retained data stream will be less than that of the received data stream since some data is discarded. Furthermore, it may be desirable for this rate to be slightly overestimated to avoid overflow of the output buffer 240. The amount of overestimation is reduced as the estimation time interval used by the rate estimator 215 decreases.

A rate estimation signal for the processor 110 is provided from the rate estimator 215 to the control 160 of FIG. 1. Rate estimation signals are also provided to the control 160 from the other processors 120, . . . , 130. The control 160 provides a rate control signal to the MUX interface 250 of the processor 110, as well as to the MUX interfaces of the other processors. The rate control signal causes data to be output from the MUX interface 250 at a rate which is about the same as the rate determined by the rate estimator 215. However, the timing of the rate control signal to the MUX interface 250 can be adjusted by the control 160 to time-multiplex the output data from the different processors 110, 120, . . . , 130.

The output of the MUX interface 250 should therefore operate at a rate which is near the rate determined by the rate estimator 215 for a currently-active time interval. The output buffer 240 absorbs timing variations between the output of the delay buffer 225 and the input to the MUX interface 250.

The processed data stream "1" is finally output from the MUX interface 250 to the MUX 140 of FIG. 1 for time-multiplexing with the data from the other processors 120, . . . , 130, and the local data signal, if present. The control 160 may need to provide a delay between the receipt of a rate estimation signal and the transmission of a rate control signal for a given processor to avoid interference between the data output of the different processors 110, 120, . . . , 130 to the MUX 140.

The delay buffer 225 therefore provides a delay which is sufficient to enable the rate estimator 215 to estimate the data rate of the retained data stream and to communicate with the control 160 to obtain a rate control signal which designates a suitable remultiplexer output bit rate. The delay may also account for a processing time of the MUX interface 230.

Moreover, the discard function 210 and rate estimator 215 may be considered to be in a first path, while the delay buffer 225, discard function 230, output buffer 240, and MUX interface 250 are in a second path which is parallel to the first path. When two or more processors 110, 120, . . . , 130 are used, each processor may have first and second parallel paths. Moreover, each of the processors 110, 120, . . . , 130 may operate in parallel with respect to one another. That is, processing in each processor may occur at the same time.

Note that in the embodiment of FIG. 2, the rate estimator for the received data stream 235 need not monitor the fullness level of the buffer 220 to determine the data rate of the received data stream. Instead, for example, the rate estimator 235 may monitor the PCR data or other indicia of the received data stream. Alternatively, a bit counter may be used to count the number of bits in a given time interval. Thus, the fullness level signal is not necessarily required to practice the invention.

Moreover, the rate estimator 235 is not necessarily required to practice the invention if the rate of the received data stream is known at the processor 110 from some other source. For example, it may be possible to provide information in the received data stream or other data stream which indicates the data rate, or the data rate may be known a priori at the processor 110. Also, if the rate of the received data stream is already smooth, smoothing buffer 220 may not be required. Even in this case, the rate estimator 235 or a priori knowledge of rate is necessary.

FIG. 3 illustrates packets from a received data stream, and from a delayed, retained data stream in accordance with the present invention. The received data stream "1" is shown at 300, while the delayed, retained data stream is shown at 350. The received data stream 300 includes packet A (305), packet B (310), packet C (315), packet D (320) and packet E (325). In this example, the rate for each packet is constant, although generally the packets will be provided at different rates. The delayed, retained data stream 350 includes packet A (305), a discarded (e.g., null) packet 310', packet C (315), packet D (320) and a discarded packet 325'.

Note that the delayed, retained data stream 350 is delayed relative to the received data stream 300. The delay shown in the figure is not necessarily to scale, as the actual delay may be substantially more than the duration of one packet.

As can be seen, the present invention provides an efficient system for remultiplexing data streams with variable packet rates. The output data rate of the remultiplexer varies with the rate of the specific packet types in the data streams. The system is very efficient since the output data rate is only very slightly higher than the sum of the data rates of the retained packets that are output. Moreover, the system guarantees that the output bitstream complies with real-time timing and buffer constraints, such as those specified by the MPEG-2 Systems standard.

However, it should be appreciated that the invention is not limited to MPEG-2 data and may adapted for use in virtually any type of variable rate digital data.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for remultiplexing at least first and second packetized digital data streams which are received from a communication path, at least said first data stream having packets provided at variable data rates therein, comprising the steps of:
   (a) processing the received first data stream in first and second parallel paths;
   (b) discarding and retaining particular packets of the first received data stream in the first path according to a packet selection signal to obtain a first retained data stream;
   (c) estimating a data rate of the first retained data stream;
   (d) providing a signal in the first path indicative of the estimated data rate;
   (e) delaying the first received data stream in the second path according to a processing delay of at least the estimating step (c) to provide a corresponding first delayed data stream;
   (f) discarding and retaining particular packets of the first delayed data stream according to the packet selection signal to obtain a first delayed, retained data stream in the second path which corresponds to the first retained data stream in the first path; and
   (g) providing a rate control signal according to the signal of said step (d) for time-multiplexing the first delayed, retained data stream with packets from the second data stream in a remultiplexed data stream.

2. The method of claim 1, comprising the further step of: smoothing the first received data stream to reduce short-term fluctuations in its data rate prior to said processing step (a).

3. The method of claim 2, wherein said smoothing step uses a smoothing buffer to smooth the data rate of the first received data stream, comprising the further steps of:

(h) inputting the first received data stream to the smoothing buffer;

(i) estimating a data rate of the first received data stream according to a fullness level of the smoothing buffer;

(j) providing a rate control signal according to the estimated data rate from said step (i); and (k) outputting the first received data stream from the smoothing buffer according to the rate control signal of said step (j).

4. The method of claim 1, wherein said delaying step (e) uses a delay buffer to delay the first received data stream, comprising the further steps of:

(h) estimating a smoothed data rate of the first received data stream;

(i) inputting the first received data stream to the delay buffer;

(j) outputting the first received data stream from the delay buffer according to the estimated data rate from said step (h).

5. The method of claim 4, comprising the further steps of:

(k) smoothing the first received data stream using a smoothing buffer to reduce short-term fluctuations in its data rate prior to said processing step (a);

(1) providing a control signal which indicates a fullness level of the smoothing buffer;

(m) estimating a data rate of the first received data stream according to the control signal of said step (1); and (n) outputting the first received data stream from the smoothing buffer according to the estimated data rate of said step (m).

6. The method of claim 1, wherein:

the packet selection signal designates packet identifiers of the packets which are to be discarded or retained.

7. The method of claim 1, comprising the further steps of:

(h) buffering the first delayed, retained data stream provided in said step (f) in an output buffer;

(i) providing the buffered first delayed, retained data stream to a multiplexer interface; and (j) providing the rate control signal from said step (g) to the multiplexer interface for time-multiplexing the first delayed, retained data stream with the packets from the second data stream in the remultiplexed data stream; wherein:

the buffering step reduces timing variations in the first delayed, retained data stream provided in said delaying step (e) relative to the first delayed, retained data stream provided to the multiplexer interface in said step (i).

8. The method of claim 1, comprising the further step of:

time-multiplexing a local data signal with the first delayed, retained data stream and the packets from the second digital data stream in the remultiplexed data stream.

9. The method of claim 1, wherein:

said first received data stream comprises fixed length packets.

10. The method of claim 1, wherein said second data stream has packets provided at variable data rates therein, comprising the further steps of:

(h) processing the received second data stream in corresponding first and second parallel paths;

(i) discarding and retaining particular packets of the second received data stream in the corresponding first path according to a corresponding packet selection signal to obtain a second retained data stream;

(j) estimating a data rate of the second retained data stream;

(k) providing a signal in the corresponding first path indicative of the corresponding estimated data rate;

(l) delaying the second received data stream in the corresponding second path according to a processing delay of at least the estimating step (j) to provide a corresponding second delayed data stream;

(m) discarding and retaining particular packets of the second delayed data stream according to the corresponding packet selection signal to obtain a second delayed, retained data stream in the corresponding second path which corresponds to the second retained data stream in the corresponding first path; and (n) providing a rate control signal according to the signal of said step (k) for time-multiplexing the second delayed, retained data stream with the first delayed, retained data stream in said remultiplexed data stream.

11. An apparatus for remultiplexing at least first and second packetized digital data streams which are received from a communication path, at least said first data stream having packets provided at variable data rates therein, comprising:

(a) means for processing the received first data stream in first and second parallel paths;

(b) means for discarding and retaining particular packets of the first received data stream in the first path according to a packet selection signal to obtain a first retained data stream;

(c) means for estimating a data rate of the first retained data stream;

(d) means for providing a signal in the first path indicative of the estimated data rate;

(e) means for delaying the first received data stream in the second path according to a processing delay of at least the estimating means (c) to provide a corresponding first delayed data stream;

(f) means for discarding and retaining particular packets of the first delayed data stream according to the packet selection signal to obtain a first delayed, retained data stream in the second path which corresponds to the first retained data stream in the first path; and (g) means for providing a rate control signal according to the signal of said means (d) for time-multiplexing the first delayed, retained data stream with packets from the second data stream in a remultiplexed data stream.

12. The apparatus of claim 11, further comprising:

means for smoothing the first received data stream to reduce short-term fluctuations in its data rate prior to processing by said processing means (a).

13. The apparatus of claim 12, wherein said smoothing means comprises a smoothing buffer to smooth the data rate of the first received data stream, further comprising:

(h) means for inputting the first received data stream to the smoothing buffer;

(i) means for estimating a data rate of the first received data stream according to a fullness level of the smoothing buffer;

(j) means for providing a rate control signal according to the estimated data rate from said means (i); and (k) means for outputting the first received data stream from the smoothing buffer according to the rate control signal of said means (j).

14. The apparatus of claim 11, wherein said delaying means (e) comprises a delay buffer to delay the first received data stream, further comprising:

(h) means for estimating a smoothed data rate of the first received data stream;

(i) means for inputting the first received data stream to the delay buffer;

(j) means for outputting the first received data stream from the delay buffer according to the estimated data rate from said means (h).

15. The apparatus of claim 14, further comprising:

(k) means for smoothing the first received data stream using a smoothing buffer to reduce short-term fluctuations in its data rate prior to processing by said processing means (a);

(l) means for providing a control signal which indicates a fullness level of the smoothing buffer;

(m) means for estimating a data rate of the first received data stream according to the control signal of said means (l); and (n) means for outputting the first received data stream from the smoothing buffer according to the estimated data rate of said means (m).

16. The apparatus of claim 11, wherein:

the packet selection signal designates packet identifiers of the packets which are to be discarded or retained.

17. The apparatus of claim 11, further comprising:

(h) an output buffer for buffering the first delayed, retained data stream provided by said means (f);

(i) means for providing the buffered first delayed, retained data stream to a multiplexer interface; and (j) means for providing the rate control signal from said means (g) to the multiplexer interface for time-multiplexing the first delayed, retained data stream with the packets from the second data stream in the remultiplexed data stream; wherein:

the buffering means reduces timing variations in the first delayed data stream provided by said delaying means (e) relative to the first delayed, retained data stream provided to the multiplexer interface by said means (i).

18. The apparatus of claim 11, further comprising:

means for time-multiplexing a local data signal with the first delayed, retained data stream and the packets from the second data stream in the remultiplexed data stream.

19. The apparatus of claim 11, wherein:

said first received data stream comprises fixed length packets.

20. The apparatus of claim 11, wherein said second data stream has packets provided at variable data rates therein, further comprising:

(h) means for processing the received second data stream in corresponding first and second parallel paths;

(i) means for discarding and retaining particular packets of the second received data stream in the corresponding first path according to a corresponding packet selection signal to obtain a second retained data stream;

(j) means for estimating a data rate of the second retained data stream;

(k) means for providing a signal in the corresponding first path indicative of the corresponding estimated data rate;

(l) means for delaying the second received data stream in the corresponding second path according to a processing delay of at least the estimating means (j) to provide a corresponding second delayed data stream;

(m) means for discarding and retaining particular packets of the second delayed data stream according to the corresponding packet selection signal to obtain a second delayed, retained data stream in the corresponding second path which corresponds to the second retained data stream in the corresponding first path; and (n) means for providing a rate control signal according to the signal of said means (k) for time-multiplexing the second delayed, retained data stream with the first delayed, retained data stream in said remultiplexed data stream.

* * * * *